UNITED STATES PATENT OFFICE.

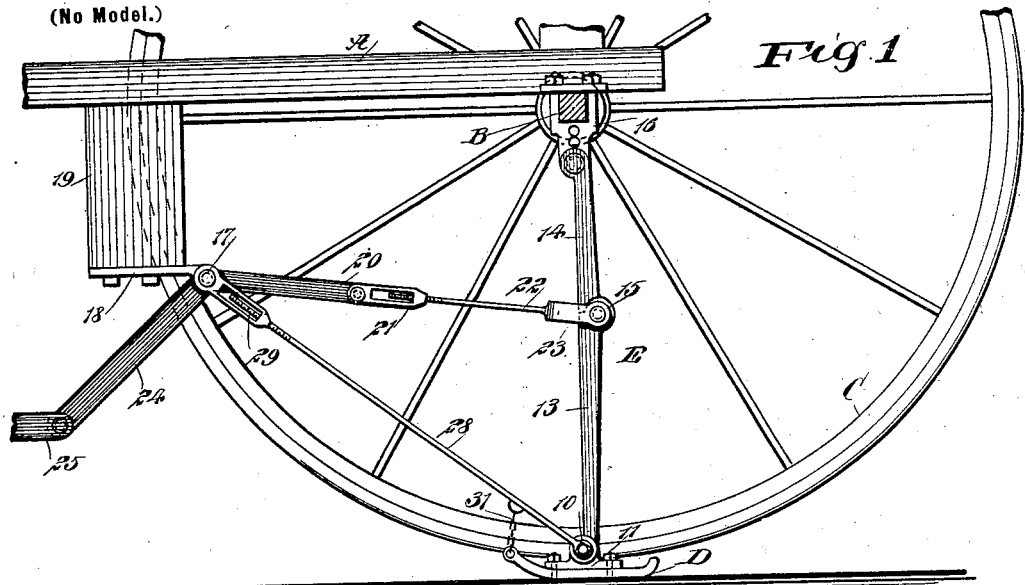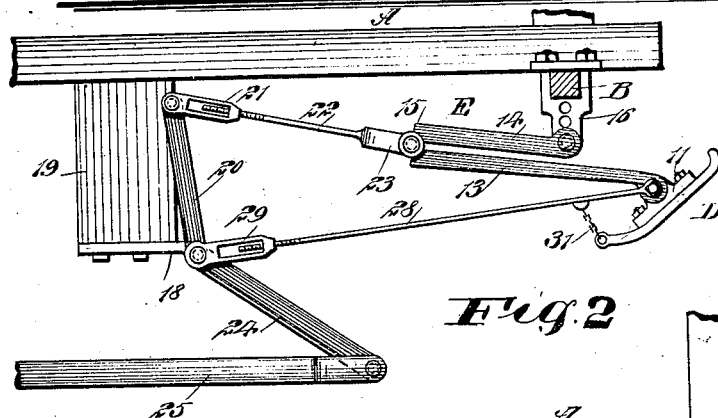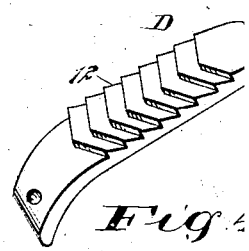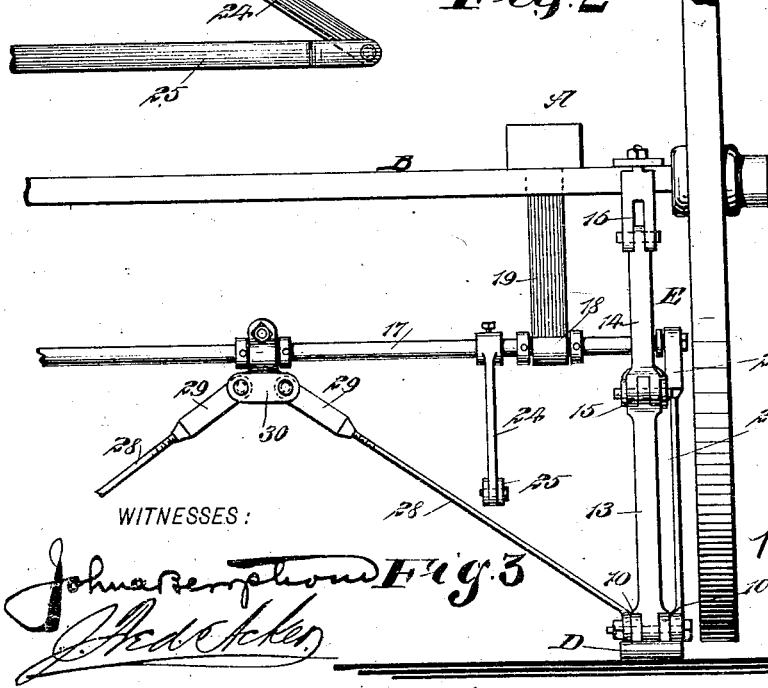

RICHARD C. G. NEUMANN AND GEORGE L. HARTMANN, OF SEATTLE, WASHINGTON.

VEHICLE-BRAKE.

SPECIFICATION forming part of Letters Patent No. 648,778, dated May 1, 1900.

Application filed August 9, 1899. Serial No. 726,677. (No model.)

*To all whom it may concern:*

Be it known that we, RICHARD C. G. NEUMANN and GEORGE L. HARTMANN, of Seattle, in the county of King and State of Washington, have invented a new and Improved Vehicle-Brake, of which the following is a full, clear, and exact description.

One object of the invention is to provide a simple and effective vehicle-brake of that type which in application contacts with the ground and raises the rear wheels from off the ground.

A further object of the invention is to provide a brake of the character specified that may be used during all seasons of the year and in the construction of which but few parts are used and all parts will be light and durable and to furnish a brake for wheels having rubber tires and to prevent unnecessary wear of the same.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the rear portion of the running-gear of the vehicle, illustrating the application of the improved brake thereto, the brake being in operative position. Fig. 2 is a view similar to Fig. 1, the supporting-wheel being omitted and the brake being illustrated in an upper position or out of engagement with the ground. Fig. 3 is a partial rear elevation of the running-gear shown in Fig. 1 and one of the brakes applied thereto; and Fig. 4 is a perspective view of a brake-shoe viewed from the bottom, which shoe is particularly adapted for use in winter.

The reach A, the axle B, and wheel C of the vehicle may be of any suitable construction. Two brake-shoes D are employed, both of which are adapted for engagement with the ground, and these brake-shoes are located between the rear wheels and adjacent to the inner faces thereof. The brake-shoe shown in Figs. 1, 2, and 3 is that which is ordinarily used in summer or when ice and snow are not on the ground, and said brake-shoe is provided with a central flat surface and upturned ends, and when the shoe is for summer use the under face of said shoe is smooth. The said shoe is preferably provided at each side of its center with upwardly-extending ears 10, which ears are either attached directly to the shoe or to the side portions of a plate 11, extending longitudinally of the upper portion of the shoe at its center and bolted thereto.

In Fig. 4 we have illustrated a shoe especially adapted for use in winter, in which it will be observed that the straight bottom surface of the shoe is provided with serrations or teeth 12, all inclined in the same direction, so that the said shoe may obtain a purchase on ice or on frozen ground. Each shoe D is provided with a hanger E, and this hanger is made in two sections 13 and 14, connected at their centers by a rule-joint 15, flexing in direction of the front of the vehicle, and the lower member 13 of each brake-shoe hanger E is pivotally attached at its lower end to a brake-shoe D, between the ears 10 of said shoe, while the upper end of the upper member 14 of each brake-shoe hanger is pivotally attached to a clip 16, secured to the axle B.

A rock-shaft 17 is located below the reach, forward of the brake-shoe hangers E, and said rock-shaft 17 is journaled in suitable bearings 18, attached to the upper portion of the running-gear by brackets 19 or their equivalents. Two arms 20 are secured to the said rock-shaft 17, one opposite the forward edge of each brake-shoe hanger E. These arms 20 serve as levers and at their rear ends are pivotally connected with turnbuckles 21, which turnbuckles receive the forward ends of lift-rods 22, and said lift-rods at their rear ends are provided with forks 23, mounted upon the pivot-pin of the rule-joints 15 of the said brake-shoe hangers E. When the lever-arms 20 are in the horizontal position shown in Fig. 1, the sections of the brake-shoe hangers are perpendicular and in horizontal alinement and the brake-shoes D are forced upon the ground, raising the rear wheels of the vehicle from off the ground; but when the lever-arms 20 are carried upward to the position shown in Fig. 2 the rule-joints 15 of the brake-shoe hangers E are flexed and the members 13 and 14 of the hangers are carried upward to a substantially-horizontal position, one below the other, thus taking the brake-shoes up with them and out of possible engagement with the ground. The shaft 17 is rocked by attaching thereto a lever 24, which extends downwardly and connecting a brake-bar 25 with the said lever 24, which brake-bar may be connected with a hand-lever or foot-lever within easy reach of the driver or lever worked by other power.

A brace 26 is pivotally attached to the central outer portion of each brake-shoe D, and each brace 26 at its upper end is connected with a turnbuckle 27, and said turnbuckles 27 are pivotally mounted on the ends of the rock-shaft 17. The brake-shoes are further supported by means of intermediate braces 28, which are pivotally attached to the inner central portions of the brake-shoes D, and the intermediate brace-rods 28 are connected at their upper ends with turnbuckles 29. These turnbuckles 29 are pivotally attached to opposite ends of a clip 30, said clip being pivotally located on the rock-shaft 17. The forward ends of the brake-shoes are preferably connected by chains 31 or their equivalents with the lower portions of the intermediate braces 28. It will be observed that the lift-rods 22 have an adjustable connection with the lift levers or arms 20 and that all the braces have an adjustable connection with the rock-shaft 17, so that the device is readily applicable to any form of vehicle.

Having thus described our invention, we claim as new and desire to secure by Letters Patent—

1. A vehicle-brake comprising a brake-shoe adapted for engagement with the ground, a rock-shaft mounted in the vehicle, a hanger constructed in hinged sections, one of which is connected to said brake-shoe, and a connection between said rock-shaft and said hanger whereby when the shaft is rocked the sections of the hanger will be moved to bend or straighten the hanger, as set forth.

2. A vehicle-brake consisting of brake-shoes adapted for engagement with the ground, hangers for the brake-shoes constructed in hinged sections, a rock-shaft, lift-levers carried by the rock-shaft, lift-rods connecting said lift-levers with the brake-hangers at the hinges thereof, and means for rocking the said shaft, for the purpose described.

3. A brake for vehicles, consisting of brake-shoes adapted for engagement with the ground, brake-hangers pivotally attached to the shoes, each hanger consisting of two sections connected by a rule-joint, a rock-shaft, lift-levers connected with the rock-shaft, a lift-rod adjustably connected with each lift-lever and pivotally connected with a brake-hanger at the joint thereof, the lift-rod and lift-lever being arranged to exert tension on the members of the brake-hangers in direction of the break of the respective joints, and means for rocking the said shaft.

4. In a vehicle-brake, the combination, with a brake-shoe adapted for engagement with the ground, hangers pivotally attached to the said shoes, said hangers being constructed in sections and the sections connected by rule-joints, a rock-shaft, lift-levers secured to the rock-shaft, lift-rods pivotally connected with the said lift-levers and with the brake-hangers at their joints, the lift-rods and lift-levers being adapted to exert tension on the brake-hangers in the direction in which their joints break, of braces pivotally connected with the outer surfaces of the brake-shoes and with the rock-shaft, intermediate braces pivotally connected with the inner faces of the brake-shoes and with the rock-shaft intermediate of its ends, a brake-lever connected with the rock-shaft, and a brake-bar connected with said lever, for the purpose described.

RICHARD C. G. NEUMANN.
GEORGE L. HARTMANN.

Witnesses:
EDWARD C. KRIETE,
J. HENRY DENNING.